United States Patent [19]

Belfoure et al.

[11] Patent Number: 5,116,905

[45] Date of Patent: May 26, 1992

[54] POLYCARBONATE RESIN MIXTURES

[75] Inventors: Edward L. Belfoure, New Harmony; Omar M. Boutni, Mt. Vernon, both of Ind.

[73] Assignee: General Electric Company, Mt. Vernon, Ind.

[21] Appl. No.: 153,532

[22] Filed: Jan. 29, 1988

Related U.S. Application Data

[63] Continuation of Ser. No. 527,744, Aug. 30, 1983, abandoned.

[51] Int. Cl.$^5$ .............................................. C08L 69/00
[52] U.S. Cl. ..................................... 525/67; 525/64; 525/439; 525/444
[58] Field of Search ........................................... 525/67

[56] References Cited

U.S. PATENT DOCUMENTS

| | | | |
|---|---|---|---|
| 3,864,428 | 2/1975 | Nakamura | 525/67 |
| 4,180,494 | 12/1979 | Fromuth | 525/63 |
| 4,226,961 | 10/1980 | Motz | 525/439 |
| 4,267,096 | 5/1981 | Bussink | 525/67 |
| 4,280,949 | 7/1981 | Dieck | 525/67 |
| 4,352,907 | 10/1982 | Lee | 525/439 |
| 4,391,954 | 7/1983 | Scott | 525/439 |
| 4,482,672 | 11/1984 | Neuray et al. | 525/67 |

FOREIGN PATENT DOCUMENTS 064648 11/1982 European Pat. Off.

Primary Examiner—Patricia Short
Attorney, Agent, or Firm—Martin B. Barancik

[57] ABSTRACT

Novel compositions with high impact strength in both thin and thick-walled sections, and good weld line strength at room temperatures are provided in the form of resinous mixtures comprising:

(A) an aromatic carbonate polymer resin selected from the group consisting of
  (i) an aromatic polycarbonate resin,
  (ii) a poly(ester-carbonate) copolymer resin, and
  (iii) a mixture of (i) and (ii); and
(B) an impact modifier combination therefor comprising
  (i) a polyester resin selected from the group consisting of
    (a) a poly(alkyene terephthalate) resin, when (A) is (i) or (iii); and
    (b) an amorphous copolyester copolymer resin, and
    (c) a mixture of (a) and (b); and
  (ii) a diene based, grafted core-shell copolymer.

4 Claims, No Drawings

POLYCARBONATE RESIN MIXTURES

This application is a continuation of application Ser. No. 06/527,744, filed Aug. 30, 1983, now abandoned.

BACKGROUND OF THE INVENTION

The present invention relates to thermoplastic compositions having improved impact strength. More particularly, it relates to polycarbonate resin mixtures which possess improved impact strength in both thinner and/or thicker sections and good weld line strength, at room temperatures.

Aromatic carbonate polymers are well known, commercially available materials having a wide variety of applications in the plastics art. Such carbonate polymers may be prepared by reacting a dihydric phenol, such as 2,2-bis(4-hydroxyphenyl) propane, with a carbonate precursor, such as phosgene, in the presence of an acid binding agent. Generally speaking, aromatic polycarbonate resins offer a high resistance to the attack of mineral acids, may be easily molded, are physiologically harmless as well as strain resistant. It is also well known that polycarbonate resins have high impact strength below a critical thickness of between about ⅛ and ¼ inch. Wherein the ductile to brittle transition occurs. Moreover, the impact strength of polycarbonate resins decreases rapidly as the temperature decreases below about −5° C. and also after aging polymers at elevated temperatures above about 100° C. These characteristics consequently limit the fields of application for unmodified aromatic polycarbonate resins.

Accordingly, in an effort to improve the impact resistant behavior of polycarbonate resins, it has been proposed to add modifiers to the polycarbonate. In Goldblum, U.S. Pat. No. 3,431,224, assigned to the same assignee as the present invention, for example, it is proposed to add modifiers, in certain proportions, the modifiers comprising at least one member of the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ester, and a polyurethane elastomer. Although the results with such modifiers are generally excellent in thin sections, e.g., in parts of ⅛ inch thickness, there is a tendency for failure to occur with these modifiers in thicker molded parts of ¼ inch or more, and such failure is of the undesirable brittle type.

Another modifier proposed to be added to polycarbonate is reported in Research Disclosure No. 20810, Dow Chemical Company, Aug. 1981. Data are provided showing that polycarbonate modified with a linear low density polyolefin, namely ethylene/octene-1 copolymer, provide good impact strength at increased part thickness.

In U.S. Pat. No. 4,245,058 to Liu, assigned to the same assignee as the present invention, it is disclosed that compositions comprising a high molecular weight aromatic polycarbonate, an acrylate copolymer and a polyolefin exhibit improved aged impact strength, both low and high temperature impact strength and good weld line strength as compared with unmodified polycarbonate.

Nakamura et al. disclose in U.S. Pat. No. 3,864,428 compositions comprising blends of aromatic polyester, aromatic polycarbonate and butadiene-based graft copolymers, wherein the polycarbonate comprises from 10 to 75 weight percent of the overall blend. which are said to possess good room temperature impact strength.

Fromuth et al., in U.S. Pat. No. 4,180,494, disclose high impact strength compositions comprising about 25 to 95 percent by weight aromatic polyester, about 1 to 8 percent by weight of an aromatic polycarbonate and the balance to make 100% of a core-shell copolymer having a butadiene-based core.

Farnham et al., in U.S. Pat. No. 4,086,202 disclose that the impact resistance of poly(alkylene terephthalate) resins is improved by the incorporation of a multiphase composite interpolymer having an elastomeric first stage and a thermoplastic final stage.

Although many of the above-mentioned patents and applications provide polycarbonate compositions possessing good impact strength at room temperature and in thinner sections, and some possess good impact properties over broad temperature ranges and section thicknesses, other compositions possessing good impact strength at room temperatures in both thin sections and thick sections are still desired.

SUMMARY OF THE INVENTION

Unexpectedly, in view of the foregoing, it has now been discovered that an aromatic polycarbonate resin, or an aromatic poly(ester-carbonate) copolymer resin or a mixture of such resins may be provided with enhanced room temperature impact strength in thin-walled and/or thick-walled molded sections by incorporating therewith, in certain proportions, an impact modifier combination therefor comprising a polyester resin selected from poly(alkylene terephthalate) resins or an amorphous copolyester copolymer resin, or a mixture of two or more of said resins and a grafted core-shell copolymer having a conjugated diene-vinyl aromatic core, a second stage of polymerized vinyl aromatic units and a final stage polymerized from an acrylate or methacrylate monomer together with a cross-linking agent.

It has now been found that when the abovementioned modifiers are added to a polycarbonate resin or a poly(ester-carbonate) copolymer resin, within certain ranges, the resultant mixtures possess improved impact strength in thicker sections and/or in thinner sections at room temperatures, and good weld line strength.

DETAILED DESCRIPTION OF THE INVENTION

In accordance with the present invention it has been found that the foregoing desirable properties are obtained with resin mixtures comprising an intimate blend of:
(A) an aromatic carbonate polymer resin selected from the group consisting of
 (i) an aromatic polycarbonate resin,
 (ii) an aromatic poly(ester-carbonate) resin, and
 (iii) mixtures of (i) and (ii); and (B) an impact modifier combination therefor comprising:
 (i) a polyester resin selected from the group consisting of
  (a) a poly(alkylene terephthalate) resin, when (A) is (i) and (iii) or together with (b) when A is (ii) and
  (b) an amorphous copolyester copolymer resin, alone or in further combination with (a); and
 (ii) a grafted core-shell copolymer resin comprising a first elastomeric core phase of a conjugated diene preferably a copolymer of conjugated diene vinyl aromatic, said core being polymerized from over 50 weight percent of said diene, optionally a second intermediate phase of a polymerized vinyl monomer grafted to said core, and a final stage or shell polymerized from a monomer selected from the group consisting of a $C_1$-$C_6$ alkyl acrylate, a $C_1$-$C_6$ alkyl methacrylate, acrylic acid, methacrylic acid and a mixture of any of the foregoing, together with a cross-linking agent.

All of the various possible combinations of the above-identified components may be utilized to produce impact resistant compositions within the scope of the present invention. The many intended embodiments of the invention will be identified and described more particularly hereinafter.

The amounts of the modifiers to be employed may vary broadly but, in general, best results will be obtained when the compositions comprise from about 50 to 90 parts by weight of aromatic carbonate resin component (A) and from about 10 to 50 parts by weight of impact modifier combination (B), based upon the weight of the overall composition of A and B. More particularly, in the impact modifier combination (B), the polyester resin component (i) comprises from about 9 to about 40 parts by weight and the grafted core shell copolymer component (ii) comprises from about 1 to about, 10 parts by weight based upon the weight of the overall composition.

With respect to the B modifier combination, if only B(i)(a) is present as sole B(i) there should be no more than about 25 parts B(i)(a). However if B(i)(b) is present as sole B(i) there should be no more than about 35 parts. When both B(i)(a) and B(i) (b) are together there should be no more than about 38 parts.

The addition of the modifiers may be accomplished in any manner so long as a thorough distribution of the modifiers in the aromatic carbonate polymer resin (a) is obtained. Generally, the polyester resin component (b), if used, is blended with the aromatic carbonate polymer resin (A)(i) first and thereafter the modifier combination is added, but this is not critical.

The mixing of these materials may be accomplished by a variety of methods normally employed for incorporation of plasticizers or fillers into thermoplastic polymers, including but not limited to, mixing rolls, dough mixers, Banbury mixers, extruders, and other mixing equipment. The resulting mixtures may be handled in any conventional manner employed for the fabrication or manipulation of thermoplastic resins. The materials may be formed or molded using compression, injection, calendering, extrusion and blow molding techniques, alone or in any combination. Also multi-processing methods, such as extrusion blow molding or co-extrusion-co-injection can be used, e.g, for multi-layer containers.

It should be understood that the resin mixtures prepared in accordance with the invention may also contain, in addition to the above-mentioned polymers, other additives to lubricate, reinforce, prevent oxidation, or lend color to the material. Other additives, such as mold release agents and stabilizers are well known in the art, and may be incorporated without departing from the scope of the invention.

The fact that the addition of the combination of components specified above to a polycarbonate resin system provides a resinous mixture having an improved resistance to impact failure over a broad range of temperatures and over a broad range of molded section thicknesses is totally unexpected and not fully understood.

The compositions of the subject invention comprise (A) an aromatic carbonate polymer resin selected from (i) an aromatic polycarbonate resin, (ii) an aromatic poly(ester-carbonate) copolymer resin, and (iii) mixtures of (i) and (ii).

The aromatic carbonate polymer resin will generally comprise from about 50 to 90 parts by weight of the overall composition.

The aromatic polycarbonate resins for use herein as component (A) (i) may be prepared by reacting a dihydric phenol with a carbonate precursor, such as phosgene, a haloformate or a carbonate ester. Generally speaking, such carbonate polymers may be typified as possessing recurring structural units of the formula:

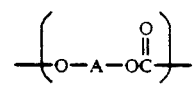

I wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl./g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:

2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-[4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the preparation of the above polycarbonates are disclosed in U.S. Pat. Nos. 2,999,835, 3,038,365, 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S Pat. Nos. 4,018,750 and 4,123,436, or by transesterification processes such as are disclosed in U.S. Pat. No.

3,153,008, as well as other processes known to those skilled in the art.

It is possible to employ two or more different dihydric phenols or a copolymer of a dihydric phenol with a glycol or with a hydroxy-or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184 Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (A) (i) herein is a homopolymer derived from 2,2-bis(4-hydroxylphenyl) propane (bisphenol-A).

The poly(ester-carbonate) copolymer resins (A) (ii) for use in the subject invention may generally be described as copolyesters comprising recurring carbonate groups,

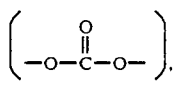

carboxylate groups,

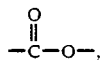

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, a dihydric phenol and a carbonate precursor.

The dihydric phenols useful in formulating the poly(ester-carbonates)for use as component (A)(ii) herein may be represented by the general formula:

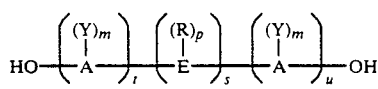

which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidine, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl), a cycloalkylidene (i.e. cyclohexylidene), a sulfur-containing linkage, such as sulfide, sulfoxide or sulfone; an ether linkage; a carbonyl group; a tertiary nitrogen group; or a silicon-containing linkage such as silane or siloxy. Other groups which E may represent will occur to those skilled in the art. R is hydrogen or a monovalent hydrocarbon group such as alkyl (methyl, ethyl, propyl, etc.), aryl (phenyl, naphthyl, etc.), aralkyl (benzyl, ethylphenyl, etc.) or cycloaliphatic (cyclopentyl, cyclohexyl, etc.). Y may be an inorganic atom such as chlorine, bromine, fluorine, etc; an inorganic group such as the nitro group, etc; an organic group such a R above, or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one, is either zero or one, and u is any whole number including zero.

In the dihydric phenol compound represented by Formula II above, when more than one Y substituent is present, they may be the same or different. The same is true for the R substituent. Where s is zero in Formula II and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in this invention include
2,2-bis-(4-hydroxyphenyl)-propane (bisphenol-A);
2,4'-dihydroxydiphenylmethane;
bis-(2-hydroxyphenyl)-methane;
bis-(4-hydroxyphenyl-methane;
bis-(4-hydroxy-5-nitrophenyl)-methane;
bis-(4-hydroxy-2,6-dimethyl-3-methoxyphenyl)methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)propane;
2,2-bis-(4-hydroxyphenyl)-1-phenylpropane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene, etc.

Also useful are dihydric phenols wherein E is a sulfur containing radical such as the dihydroxy aryl sulfones exemplified by: bis-(4-hydroxyphenyl) sulfone; 2,4'-dihydroxydiphenyl sulfone; 5-chloro-2,4'-dihydroxydiphenyl sulfone; 3-chloro-bis-(4-hydroxyphenyl) sulfone; and 4,4'-dihydroxytriphenyldisulfone; etc. The preparation of these and other useful sulfones are described in U.S. Pat. No. 2,288,282. Polysulfones as well as substituted sulfones using halogen, nitrogen, alkyl radicals, etc. are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:

4.4′-dihydroxydiphenyl ether;
4.4′-dihydroxytriphenyl ether;
the 4,3′-, 4,2′-, 4,1′-, 2,2′-, 2,3′-, etc. dihydroxydiphenyl ethers;
4,4′-dihydroxy-2,6-dimethyldiphenyl ether;
4,4′-dihydroxy-2,5-dimethyldiphenyl ether;
4,4′-dihydroxy-3,3′-diisobutyldiphenyl ether;
4,4′-dihydroxy-3,3′-diisopropyldiphenyl ether;
4,4′-dihydroxy-3,3′-dinitrodiphenyl ether;
4,4′-dihydroxy-3,3′-dichlorodiphenyl ether;
4,4′-dihydroxy-3,3′-difluorodiphenyl ether;
4,4′-dihydroxy-2,3′-dibromodiphenyl ether;
4,4′-dihydroxydinaphthyl ether;
4,4′-dihydroxy-3,3′-dichlorodinaphthyl ether;
2,4-dihydroxytetraphenyl ether;
4,4′-dihydroxypentaphenyl ether;
4,4′-dihydroxy-2,6-dimethoxydiphenyl ether;
4,4′-dihydroxy-2,5-diethoxy-diphenyl ether, etc.

Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of polyester-carbonates useful in formulating the compositions of the present invention. In general, the carboxylic acids which may be used include the aliphatic carboxylic acids, aliphatic-aromatic carboxylic acids, or aromatic carboxylic acids. The aromatic dicarboxylic acids or their reactive derivatives such as the aromatic diacid halides are preferred as they produce the aromatic polyestercarbonates which are most useful, from the standpoint of physical properties, in the practice of the instant invention.

These carboxylic acids may be represented by the general formula:

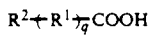

$$R^2\!\!-\!\!R^1\!\!\frac{}{q}COOH \qquad III$$

wherein $R^1$ represents an alkylene, alkylidene or cycloaliphatic group in the same manner as set out above for E in Formula II; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula II; or a divalent aliphatic-aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid halides, are preferred. Thus in these preferred aromatic dicarboxylic acids, as represented by Formula III, $R^2$ is a carboxyl group and $R^1$ is an aromatic radical such as phenylene, biphenylene, napthylene, substituted phenylene, etc., two or more aromatic groups connected through non-aromatic linkages; or a divalent aliphatic-aromatic radical. Some nonlimiting examples of suitable preferred aromatic dicarboxylic acids which may be used in preparing the polyestercarbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid.

These acids may be used individually or as mixtures of two or more different acids.

The carbonate precursor may be either a carbonyl halide, a carbonate ester, or a haloformate. The carbonyl halides which can be employed herein are carbonyl chlorides and carbonyl bromide. Typical of the carbonate esters which may be employed herein are diphenyl carbonate, di(halophenyl) carbonates such as di(chlorophenyl) carbonate, di(bromophenyl)carbonate, di(trichlorophenyl)carbonate, di(tribromophenyl)-carbonate, etc., di(alkylphenyl)carbonates such as di(tolyl) carbonate, etc., di(naphthyl)carbonate, di(chloronaphthyl) carbonate, phenyltolyl carbonate, chloronaphthyl chlorophenyl carbonate, and the like. The haloformaes suitable for use herein include bishaloformates of dihydric phenols such as bischloroformates of hydroquinone, etc. or glycols such as bis-haloformates of ethylene glycol, neopentyl glycol, polyethylene glycol, etc. While other carbonate precursors will occur to those skilled in the art, carbonyl chloride, also known as phosgene is preferred.

The preparation of polyester-carbonates which may be employed in the compositions of the present invention is described in U.S. Pat. Nos. 3,030,331; 3,169,121; 3,207,814; 4,194,038 and 4,156,069 and assigned to the same assignee as the instant application, all of which are incorporated herein by reference.

The polyester-carbonates which are useful in the practice of the present invention include the aromatic polyester-carbonates derived from dihydric phenols, aromatic dicarboxylic acids or their reactive derivatives such as the aromatic diacid halides, and phosgene. A quite useful class of aromatic polyestercarbonate is that derived from bisphenol A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of dihydroxydiaryl units to benzenedicarboxylate units to carbonate units can range from 1:0.30–0.90:0.70–0.10 and the molar ratio of terephthalate units to isophthalate units can range from 9:1 to 0.3:9.7.

The subject invention also comprises as component (B) an impact modifier combination comprising
 (i) a polyester resin selected from the group consisting of
  (a) a poly(alkylene terephthalate) resin, when (A) is (i) or (iii), and
  (b) an amorphous copolyester copolymer resin, alone, or in further combination with (a); and
 (ii) a grafted core-shell copolymer.

The polyester resin component (B)(i) will generally comprise from about 9 to about 40 parts by weight, based upon the weight of the overall composition.

It has now been discovered that the combination of a poly(alkylene terephthalate) resin and a grafted core-shell copolymer resin provides excellent impact resistance to an aromatic polycarbonate resin and aromatic polycarbonate/poly(ester-carbonate) copolymer resin mixtures. It has also been discovered however, that this particular impact modifier combination is very difficult to incorporate in a poly(ester-carbonate) copolymer resin alone to achieve a stable multicomponent resin blend, and for this reason, blends of a poly(estercarbonate) and a modifier combination of a poly(alkylene terephthalate) and a grafted core-shell copolymer resin are not included within the scope of this invention. On the other hand, blends including the amorphous copolyester copolymers (B)(i)(b) alone, or together with a poly(alkylene terephthalate) resin and grafted coreshell copolymer resins are effective impact modifier combinations for each of the polycarbonate resins defined for component (A) herein, and are included in the subject invention.

The poly(alkylene terephthalate) resins for use as component (B)(i)(a) herein are very well known and may be prepared by methods set forth in Whinfield, U.S. Pat. No. 2,465,319 and Pengilly, U.S. Pat. No. 3,047,539. The polyalkylene terephthalate resins for use herein will generally comprise a $C_1$–$C_{10}$ polyalkylene terephthalate. Poly(ethylene terephthalate) is generally preferred and may be utilized as virgin or scrap polymer. If desired, other polyalkylene terephthalates such as poly(1,4-butylene terephthalate) may be employed or mixtures of polyalkylene terephthalates.

The amorphous copolyester copolymer resin for use as component (B)(i)(b) herein is a polyester copolymer which can, without limitation, comprise the reaction product of a glycol portion comprising 1,4-cyclohexanedimethanol and ethylene glycol wherein the molar ratio of the 1,4-cyclohexanedimethanol to ethylene glycol in the glycol portion is from about 4:1 to 1:4, with an acid portion comprising terephthalic acid, or isophthalic acid or mixtures of both acids.

The copolyester component (B)(i)(b) may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters for use as component (B)(i)(b) in the subject invention generally will have an internal viscosity of at least about 0.4 dl./gm. as measured in 60/40 phenol/tetrachloroethane or other similar solvent at about 25° C. and will have a heat distortion temperature of from about 60° C. to 70° C. The relative amounts of the 1,4-cyclohexanedimethanol to ethylene glycol in the glycol portion may vary so long as the molar ratio of 1,4-cyclohexanedimethanol to ethylene glycol is from 1:4 to 4:1, in order to provide a polyester copolymer having suitable properties and a heat distortion temperature within the recited range.

A preferred copolyester for use as the amorphous polyester copolymer component (B)(i)(b) in the subject invention is a copolyester as described above wherein the glycol portion has a predominance of ethylene glycol over 1,4-cyclohexanedimethanol, for example greater than 50/50 and especially preferably is about 70 molar ethylene glycol to 30 molar 1,4-cyclohexanedimethanol and the acid portion is terephthalatic acid. A preferred copolyester of this type is commercially available under the tradename KODAR PETG 6763 from Eastman Chemical Company.

Impact modifier combination, component (B), additionally comprises a grafted core-shell copolymer component (B) (ii). The grafted core-shell copolymers for use in the subject invention generally comprise a conjugated diene based core, an optional but preferred intermediate grafted phase of polymerized vinyl monomer units and a final phase or shell comprised of a polymerized monomeric compound selected from the group consisting of a $C_1$–$C_6$ alkyl acrylate, a $C_1$–$C_6$ alkyl methacrylate, acrylic acid, methacrylic acid, and a mixture of any of the foregoing with a crosslinking monomer.

More particularly, the first or core phase of grafted core-shell copolymer component (B)(ii) comprises polymerized conjugated diene units or a copolymer of polymerized diene units with polymerized units of a vinyl compound, preferably aromatic. Suitable conjugated dienes for use in said core phase include butadiene, isoprene, 1,3-pentadiene and the like. Illustrative vinyl compounds include styrene, alphamethylstryene, vinyl toluene, paramethylstyrene, and the like and esters of acrylic or methacrylic acid. The core of said copolymer should comprise at least about 50 percent of diene units. The preferred grafted core-shell copolymer for use herein includes a core of a styrene-butadiene copolymer comprising about 10 to 50% by weight styrene and about 90 to 50% by weight of butadiene, and having a molecular weight within the range of about 25,000 to 1,500,000 and preferably within the range of about 150,000 to 500,000. The core phase may also include a crosslinking monomer, more particularly described hereinafter.

Although it is optional but preferred herein, grafted core-shell copolymer (B)(ii) may include a second intermediate phase of a polymerized vinyl monomer grafted to said core phase. Suitable vinyl monomers for use in the second intermediate phase include, but are not limited to, styrene, vinyl toluene, alphamethylstyrene, halogenated styrene, naphthalene and non-aromatic molecules, for example, vinyl cyanide compounds such as acrylonitriles, methacrylonitrile, alphahalogenated acrylonitriles. These vinyl monomers can be used either alone or in admixture. Vinyl aromatics are preferred, particularly styrene.

The final or shell phase of grafted core-shell copolymer (B)(ii) comprises polymerized units of a monomeric compound selected from the group consisting of a $C_1$-$C_6$ alkyl acrylate, a $C_1$-$C_6$ alkyl methacrylate, acrylic acid, methacrylic acid, and a mixture of any of the foregoing together with a cross-linking monomer. More particularly, the monomeric compound may be a $C_1$-$C_6$ alkyl acrylate, e.g. methyl acrylate, ethyl acrylate, hexyl acrylate, and the like; a $C_1$-$C_6$ alkyl methacrylate, e.g., methyl methacrylate, ethyl methacrylate, hexyl methacrylate, and the like; acrylic acid or methacrylic acid. Methyl methacrylate is preferred.

In addition to the monomeric compound, the final or shell phase of grafted core-shell copolymer (B)(ii) includes a crosslinking monomer in an amount ranging from about 0.1 to about 2.5 parts by weight based upon the weight of the overall copolymer. The crosslinking monomer is a polyethylenically unsaturated monomer having a plurality of addition polymerizable reactive groups, all of which polymerize at substantially the same rate of reaction. Suitable crosslinking monomers include poly acrylic and poly methacrylic acid esters of polyols such as butylene diacrylate and dimethacrylate, trimethylol propane trimethacrylate, and the like, divinyl and trivinyl benzene, vinyl acrylate and methacrylate and the like. The preferred crosslinking monomer is butylene diacrylate.

It is to be understood that the copolymer for use as component (B)(ii) in the present invention must be of the grafted core-shell type. To be a core-shell copolymer, a crosslinking monomer must be present in the shell to bond the shell to the core to provide the unique structure and therefore properties imparted to the resin mixtures of the invention.

Copolymer component (B)(ii) generally comprises from about 60 to 80 parts by weight of said core phase, from about 10 to 20 parts by weight of said intermediate phase and from about 10 to 20 parts by weight of said shell phase. An especially preferred grafted core-shell copolymer for use as component (B)(ii) herein is a core-shell polymer having a core representing 77.5 parts by weight polymerized from 71 parts butadiene and 3 parts styrene, 4 parts methylmethacrylate and 1 part divinyl benzene; a second phase polymerized from 11 parts by weight styrene, and a shell polymerized from 11 parts by weight methyl methacrylate and 0.1 parts by weight of 1,3-butylene glycol dimethacrylate. A commercially available grafted core-shell polymer for use herein as component (B)(ii) is ACRYLOID KM 653 from Rohm and Haas Chemical Company.

Core-shell copolymer component (B)(ii) is prepared sequentially by emulsion polymerization techniques wherein each successive outer stage coats the previous stage polymer. By way of illustration the conjugated diene polymer, or copolymer of the diene with a vinyl aromatic monomer or monomers, with or without crosslinking agent are formed by copolymerization in water in the presence of a free radical generating catalyst and a polymerization regulator which serves as a chain transfer agent, at a temperature on the order of about 15° to about 80° C. The first diene-or diene-vinyl aromatic elastomeric core phase is formed in situ to provide a latex of the core polymer of copolymer.

Thereafter the second intermediate vinyl aromatic phase monomers are added and are emulsion polymerized with the core-copolymer latex to form a grafted interpolymer. The shell phase monomers are added to the latex of the vinyl aromatic-grafted, diene-vinyl aromatic copolymer core and are further emulsion polymerized to produce the grafted core-shell copolymer.

Any of the well known free radical generating catalysts which polymerize styrene or acrylates generally may be utilized in the emulsion polymerization. Suitable catalysts are, for example, those of the organic peroxide type such as methyl ethyl ketone peroxide and benzoyl peroxide; those of the hydroperoxide type, such as cumene hydroperoxide; those of the persulfate type, such as potassium persulfate, or catalysts such as azoisobutyronitrile. Thus, the usual water-soluble as well as the monomer-soluble types of catalysts may be employed. Amounts of catalysts used are normally within the 0.05 to 0.5 parts by weight of the monomers used.

Polymerization regulators suitable for use in the process are those organic sulfur compounds such as thioacids, high molecular weight mercaptans such as benzyl mercaptan, aliphatic mercaptans having at least six carbon atoms per molecule such as octyl, dodecyl and tertiary dodecyl mercaptan, mixtures of mercaptans such as are obtained for example from lauryl alcohol, nitrohydrazine, amino compounds, carbon tetrachloride and similar well known polymerization modifiers or regulators. Alkyl mercaptans of low water solubility such as n-dodecyl mercaptans or tertiary dodecyl mercaptan are preferred. Amounts of modifier added to control the rate of polymerization may be within the range of about 0.2 to 5% by weight of the monomers used.

Coagulation of the grafted core-shell product is then effected with a calcium chloride solution, for instance, whereupon it is filtered, washed and dried. The coagulated copolymer may also be filtered through cheesecloth and spray dried at inlet/outlet temperatures of 150° C./50° C. to provide a free flowing powder.

These core-shell copolymers and the methods for their preparation are more fully described in U.S. Pat. No. 4,180,494, incorporated herein by reference.

Within the stated components and within the broad composition ranges specified above, many resin mixtures may be prepared in accordance with the subject invention which exhibit improved impact resistant behavior over an unmodified polycarbonate resin. Thus, for example, in one embodiment, the subject invention provides resin mixtures comprising an aromatic polycarbonate resin (A)(i) and an impact modifier combination therefor comprising a poly(alkylene terephthalate)

resin (B)(i)(a) and grafted core-shell copolymer (B)(ii). In another embodiment, the subject invention comprises a resin mixture of an aromatic polycarbonate resin (A)(i) and an impact modifier combination therefore comprising (B)(i)(b) an amorphous copolyester copolymer resin and grafted core-shell copolymer (B)(ii). In still another embodiment, the subject invention comprises a resin mixture of an aromatic polycarbonate resin (A)(i) and an impact modifier combination (B) comprising a mixture of (B)(i)(a) a poly(alkylene terephthalate) resin and (B)(i)(b) a copolyester copolymer resin and grafted core-shell copolymer (B)(ii). In a further embodiment, the subject invention provides an impact resistant resin mixture comprising (A)(ii) a poly(estercarbonate) copolymer resin and an impact modifier combination therefor comprising a copolyester copolymer resin (B)(i)(b) and grafted core-shell copolymer (B)(ii). In still another embodiment, the subject invention provides an impact resistant resin mixture comprising a poly(ester-carbonate) copolymer resin (A)(ii) and an impact modifier combination therefor comprising a mixture of a poly(alkylene terephthalate) resin (B)(i) (a) and an amorphous copolyester copolymer resin (B)(i) (b) and grafted core-shell copolymer (B)(ii). In a further embodiment, the subject invention provides resin mixtures comprising (A)(iii) a mixture of aromatic polycarbonate resin (A)(i) and poly(ester-carbonate) copolymer resin (A)(ii) and an impact modifier combination therefor comprising a poly(alkylene terephthalate) resin (B)(i)(a) and grafted core-shell copolymer (B)(ii). In another embodiment, resin mixtures having improved impact strength are provided in the form of a resin mixture comprising (A)(iii) a mixture of an aromatic polycarbonate resin (A)(i) and a poly(ester-carbonate) copolymer resin (A)(ii) and an impact modifier combination therefor comprising a copolyester copolymer resin (B)(i)(b) and a grafted core-shell copolymer (B)(ii). In still another embodiment, the subject invention provides resin mixtures comprising (A)(iii) a mixture of an aromatic polycarbonate resin (A)(i) and a poly (ester-carbonate) copolymer resin (A)(ii) and an impact modifier combination therefor comprising a mixture of a poly(alkylene terephthalate) resin (B)(i)(a) and an amorphous copolyester copolymer resin (B)(i)(b) and grafted core-shell copolymer (B)(ii).

Each of the resin mixtures within the scope of this invention outlined above, provided, the composition ranges for the major components (A) and (B) specified above are adhered to, should provide resin mixtures which after molding exhibit improved impact strength in thick walled molded sections in comparison with articles molded from an unmodified (A) component. Additionally, good weld line strength for the mixtures of the invention can be obtained.

The compositions of the subject invention may be prepared by dry blending the aromatic carbonate polymer resin (A) and impact modifier combination (B) until complete dispersion of all of the ingredients is obtained. The resin mixtures are then extruded and chopped to form pellets and thereafter molded in accordance with conventional methods. The extrusion and molding cycles should preferably be carried out at temperatures below about 288° C. to avoid any thermal degradation of the polymers and thereby obtain maximum impact strength enhancement for the resin mixtures of the invention.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycarbonate resin mixtures were extruded in a Sterling extruder at about 260° C. and molded in a 3 oz. Van Dorn injection molding machine at about 260° C.

EXAMPLES 1-4

An aromatic polycarbonate derived from 2,2-bis(4-hydroxyphenyl)propane and having an intrinsic viscosity (iv) in the range of from about 0.46 to about 0.49 dl/g as determined in a methylene chloride solution at 25° C. (LEXAN® 140, General Electric Company) was mixed with a polyester resin selected from a scrap grade poly(ethylene terephthalate) (Goodyear Company) or an amorphous copolyester copolymer resin in the form of a poly((0.7)-ethylene-co-(0.3)-1,4-cyclohexanedimethylene terephthalate) resin (Kodar PETG 6763, Eastman Chemical Company) or a mixture of the two polyesters together with a grafted core-shell copolymer having a core polymerized from 71 parts by weight butadiene and 3 parts styrene, 4 parts methyl methacrylate and 1 part divinyl benzene; a second phase polymerized from 11 parts by weight styrene, and a shell phase polymerized from 11 parts by weight methyl methacrylate and 0.1 parts by weight of 1,3-butylene glycol dimethacrylate (ACRYLOID KM 653, Rohm & Haas Chemical Company). The components were mixed in a laboratory tumbler until well mixed. The mixture was then fed to an extruder which was operated at about 283° C. The resulting extrudates were comminuted into pellets. The pellets were injection molded at about 260° C. into test specimens of about 2½"×½"×⅛" and 2½×½"×¼", the latter dimension being specimen thickness. Where indicated, Izod impact strengths of these specimens were measured according to the notched Izod test, ASTM D256. The weld line strength of the samples was measured with the specimens prepared in a double gate mold in the same way as the notched Izod samples. When polymer melt was injected through the gates, a weld line was then formed in the center of the sample. Measurements were made according to ASTM D256. The numerical superscripts indicate the percent of test specimens which were ductile and the superscript H indicates that the sample failed in a hinged mode, which is an improvement over brittle failure. The sample labeled control was bisphenol-A polycarbonate containing no modifier or an incomplete modifier combination as indicated. The formulations used and the results obtained are set forth in TABLE 1. DTUL is distortion temperature under load in °C. The Notched Izod is in ft.lbs/in and the D.G. is ft.lb.

TABLE I

| COMPOSITION | AROMATIC POLYCARBONATE RESIN MODIFIED WITH A POLYESTER RESIN AND A GRAFTED CORE SHELL CO-POLYMER RESIN | | | | | | | | | |
|---|---|---|---|---|---|---|---|---|---|---|
|  | A | B | C | D | 1 | 2 | E | 3 | 4 | F |
| POLYCARBONATE | 100 | 80 | 70 | 60 | 80 | 60 | 40 | 80 | 60 | 40 |

TABLE I-continued

| COMPOSITION | A | B | C | D | 1 | 2 | E | 3 | 4 | F |
|---|---|---|---|---|---|---|---|---|---|---|
| AROMATIC POLYCARBONATE RESIN MODIFIED WITH A POLYESTER RESIN AND A GRAFTED CORE SHELL CO-POLYMER RESIN | | | | | | | | | | |
| PET | — | 20 | 30 | 40 | 20 | 40 | 60 | 10 | 20 | 40 |
| PETG | — | — | — | — | — | — | — | 10 | 20 | 20 |
| KM653 | — | — | — | — | 4.0 | 4.0 | 4.0 | 4.0 | 4.0 | 4.0 |
| DTUL °C. | — | 125.5 | 121.2 | 111.9 | 111.6 | 105.0 | 81.0 | 121 | 107.1 | 95.3 |
| ⅛" N.I. | $16^{100}$ | 2.28* | 1.85* | 1.34* | $17.2^{100}$ | 2.45* | 1.47* | $17.6^{100}$ | $16^{100}$ | 2.27* |
| ¼" N.I. | 2.0* | | | | 2.14* | 2.33* | 1.08* | $8.89^{80}$ | 2.88* | 1.61* |
| D.G. | >40 | | | | $37.1^{100}$ | $22.9^{80}$ | 16.53* | $39.2^{100}$ | $33.5^{100}$ | $25.7^{40}$ |

These data illustrate the overall impact strength improvement exhibited by compositions prepared within the scope of the subject invention over unmodified aromatic polycarbonate resins, as well as each of the controls, compositions A–F, wherein some or all of the impact modifiers are not present.

The improvements in resistance to impact failure provided by the compositions of the subject invention, as illustrated by the date of Examples 1–4, are exhibited in thick-walled specimens, as well as thin walled specimens.

EXAMPLES 5–6

The procedures of Examples 1–4 were followed exactly, except that the aromatic polycarbonate resin was replaced by a poly(ester-carbonate) copolymer resin, namely, LEXAN® 3250, General Electric Company. Although it is commercially available, a substantially identical poly(ester-carbonate) copolymer resin for use herein may be prepared as follows:

To a reactor vessel is added 16 liters of methylene chloride, 8 liters of water, 1906 grams (8.36 moles) of bisphenol-A, 24 milliliters of triethylamine, 3.4 grams of sodium glyconate, and 65 grams of paratertiary-butyl-phenol chain terminator. At a pH of between about 9–10.5, 1089.6 grams (5.37 moles) of a mixture of 15% by weight of isophthaloyl dichloride and 85% by weight of terephthaloyl dichloride in 2 liters of methylene chloride is added over a 10 minute interval while controlling the pH at about 9–10.5 with 35% aqueous caustic. After the addition of the diacid chloride mixture, phosgene is added at a rate of 36 grams per minute for 12 minutes while controlling the pH at about 10–11 with 35% aqueous caustic. The polymer mixture is diluted with 2 liters of methylene chloride and the brine phase is separated. The resulting polymer phase is washed once with 0.1 HCl and three times with water and is then recovered by high steam precipitation to yield a white powder. This preferred poly(ester-carbonate) copolymer has molar ratios of dihydroxy-diaryl units to benzene dicarboxylate units to carbonate units of about 1: 0.6–0.75 : 0.4–0.25 and a molar ratio of terephthalate units to isophthalate units of about 8.5 : 1.5.

Resin mixtures were prepared and tested in accordance with Examples 1–4. The formulations used and the results obtained are set forth in Table 2:

TABLE II

| COMPOSITIONS | G | H | I | J | K | L | M | N | 5 | 6 | O |
|---|---|---|---|---|---|---|---|---|---|---|---|
| AROMATIC COPOLYESTERCARBONATE RESIN MODIFIED WITH A POLYESTER RESIN AND A GRAFTED CORE SHELL COPOLYMER RESIN | | | | | | | | | | | |
| POLYESTERCARBONATE | 100 | 90 | 70 | 60 | 55 | 80 | 60 | 40 | 80 | 60 | 40 |
| PET | — | 10 | 30 | 40 | 45 | 20 | 40 | 60 | 10 | 20 | 40 |
| PETG | — | — | — | — | — | — | — | — | 10 | 20 | 20 |
| KM653 | — | — | — | — | — | 4.0 | 4.0 | 4.0 | 4.0 | 4.0 | 4.0 |
| DTUL °C. | 163 | 148.8 | 135.0 | 100.4 | 87.0 | 121.2 | 101.5 | 79.1 | 125.7 | 115.5 | 93.4 |
| ⅛" N.I. | 6.0* | 6.8* | 8.7* | 4.17* | 2.2* | $10.1^{80}$ | 7.5* | 1.9* | $10.2^{100}$ | $12.0^{100}$ | $9.0^{60}$ |
| ¼" N.I. | 6.0* | 5.5* | 2.3* | | 1.4* | 4.5* | 2.4* | 1.4* | 6.2* | 4.9* | 2.7* |
| D.G. | 32* | 31.2* | 25.6* | | 26.8* | $25.6^{20H}$ | 18.3* | 13.2* | $27.3^{20}$ | $28.1^{60}$ | 9.2* |

These data illustrate, that for compositions prepared in accordance with the subject invention wherein the aromatic carbonate polymer resin is a poly(ester-carbonate) copolymer resin, unexpectedly improved impact strengths over a variety of as-molded thicknesses are obtained as compared with the unmodified poly(ester-carbonate) copolymer resin or resin modified without PETG being present even when PET and KM 653 were present.

EXAMPLES 7–11

The procedures of Examples 1–6 were followed except that aromatic carbonate polymer resin component A included a mixture of both an aromatic polycarbonate resin and a poly(ester-carbonate) copolymer. Also shown are various other physical measurement all done by the appropriate ASTM test standard. The units employed are those normally associated with the tests.

TABLE III

| COMPOSITIONS | P | Q | R | S | 7 | 8 | 9 | 10 | 11 |
|---|---|---|---|---|---|---|---|---|---|
| MIXTURES OF AROMATIC POLYCARBONATE AND COPOLYESTERCARBONATE RESIN MODIFIED WITH A POLYESTER RESIN AND A GRAFTED CORE SHELL COPOLYMER RESIN | | | | | | | | | |
| POLYCARBONATE | 80 | 60 | 45 | 20 | 60 | 60 | 40 | 20 | 70 |
| POLYESTERCARBONATE | 20 | 40 | 55 | 80 | 20 | 20 | 20 | 40 | 10 |
| PET | — | — | — | — | 20 | — | 20 | 20 | 10 |
| PETG | — | — | — | — | — | 20 | 20 | 20 | 10 |
| KM653 | — | — | — | — | 4.0 | 4.0 | 4.0 | 4.0 | 4.0 |

TABLE III-continued

MIXTURES OF AROMATIC POLYCARBONATE AND COPOLY-ESTERCARBONATE RESIN MODIFIED WITH A POLYESTER RESIN AND A GRAFTED CORE SHELL COPOLYMER RESIN

| COMPOSITIONS | P | Q | R | S | 7 | 8 | 9 | 10 | 11 |
|---|---|---|---|---|---|---|---|---|---|
| DTUL °C. | — | 143.7 | — | 157 | 115.2 | 122.9 | 114.4 | 114.2 | 122.7 |
| $\frac{1}{8}$″ N.I. | — | $11.2^{100H}$ | $9.3^{100H}$ | 7.3 | $10.7^{100}$ | $13.8^{100}$ | $12.6^{100}$ | $12.5^{100}$ | $14.6^{100}$ |
| $\frac{1}{4}$″ N.I. | — | — | — | — | $2.2^c$ | $11.0^{100}$ | $3.5^c$ | $4.1^c$ | $10.9^{100}$ |
| D.G. | — | — | — | — | $27.0^c$ | $35.9^{100}$ | $29.4^{80}$ | $21.5^{20}$ | $34.7^{100}$ |
| S Tensile Impact | — | — | — | — | 114 | 271 | 68 | 81 | 113 |
| Tensile Yield | — | — | — | — | 9123 | 8548 | 8475 | 8571 | 8549 |
| Tensile Break | — | — | — | — | 8428 | 9302 | 8627 | 9534 | 8906 |
| Tensile Elongation | — | — | — | — | 65.85 | 63.41 | 63.82 | 70.69 | 69.40 |

The compositions prepared in accordance with the subject invention wherein the polycarbonate component comprises a mixture of an aromatic polycarbonate resin and a poly(ester-carbonate) copolymer resin and impact modified in accordance with the teachings of this invention, likewise exhibit unexpectedly improved impact strengths. It is preferred to have a combination of the polyalkylene terephthalate and amorphous copolyester copolymer or copolyester copolymer present in the composition.

Each of the above-mentioned patents, applications and publications are specifically incorporated herein by reference. Although the subject invention has been described with reference to certain preferred embodiments, many obvious modifications or changes may be made therein or will suggest themselves to those skilled in the art. For example, instead of a bisphenol-A polycarbonate, one containing units derived from tetramethylbisphenol-A or from dixylenol sulfone can be used as component (A)(i). Instead of a poly(ester-carbonate) based on terephthalate and isophthalate units, naphthenate units may be substituted for either. Instead of a butadiene-based grafted core-shell copolymer, one having an isoprenestyrene core could be used, to name but a few of the variations possible. All such obvious modifications are within the scope and spirit of the subject invention as defined by the appended claims.

What is claimed is:

1. A resin mixture comprising:
   (A) an aromatic polycarbonate resin and
   (B) an impact modifier combination therefor comprising:
   (i) a polyester resin comprising
      (a) a poly(alkylene terephthalate) resin, and
      (b) an amorphous copolyester copolymer resin, and
   (ii) a grafted core-shell copolymer resin comprising an elastomeric core phase comprising a conjugated diene polymer, said core being polymerized from over 50 weight percent of said diene; optionally a second intermediate phase of a polymerized vinyl aromatic monomer being grafted to said core; and a final shell phase polymerized from a monomer selected from the group consisting of a $C_1$-$C_6$ alkyl acrylate, a $C_1$-$C_6$ alkyl methacrylate, acrylic acid, methacrylic acid, and a mixture of any of the foregoing, together with a crosslinking monomer wherein component (A) comprises from about 50 to about 90 parts by weight, component (B)(i) comprises from about 9 to about 40 parts by weight and component (B)(ii) comprises from about 1 to about 10 parts by weight, based upon the weight of (A) and (B).

2. A resin mixture as defined in claim 1, wherein said polyester resin component (B)(i) comprises a mixture of a poly(alkylene terephthalate) resin (B)(i)(a) and (B)(i)(b) an amorphous copolyester copolymer resin comprising a polyester copolymer derived from
   (i) a glycol portion comprising 1,4-cyclohexanedimethanol and ethylene glycol, wherein the molar ratio of 1,4-cyclohexanediamethanol to ethylene glycol is from about 1:4 to 4:1 and
   (ii) an acid portion comprising an aromatic dicarboxylic acid selected from the group consisting of terephthalic acid, isphthalic acid, and a mixture of the two acids.

3. A resin mixture as defined in claim 1 wherein said polyester resin component (B)(i) comprises a mixture of (B)(i)(a) a poly(ethylene terephthalate) resin and (B)(ii)(b) a poly(0.7)ethylene-co-(0.3) 1,4-cyclohexanedimethylene terephthalate) resin.

4. An article molded from the composition of claim 1.

* * * * *